(12) United States Patent
de Cérou et al.

(10) Patent No.: US 11,897,572 B2
(45) Date of Patent: Feb. 13, 2024

(54) HANDLE WITH A RETRACTABLE DEVICE FOR INDICATING A CHANGE IN DIRECTION

(71) Applicant: Elliop, Marseilles (FR)

(72) Inventors: Pierre de Cérou, Marseilles (FR); Jean-François Vicente, Lombreuil (FR); Inès Loridant, Sceaux (FR)

(73) Assignee: ELLIOP, Marsielle (FR)

( * ) Notice: Subject to any disclaimer, the term of this patent is extended or adjusted under 35 U.S.C. 154(b) by 258 days.

(21) Appl. No.: 17/434,175

(22) PCT Filed: Feb. 25, 2020

(86) PCT No.: PCT/EP2020/054940
§ 371 (c)(1),
(2) Date: Aug. 26, 2021

(87) PCT Pub. No.: WO2020/173959
PCT Pub. Date: Sep. 3, 2020

(65) Prior Publication Data
US 2022/0144376 A1    May 12, 2022

(30) Foreign Application Priority Data

Feb. 26, 2019   (FR) ...................................... 1901959

(51) Int. Cl.
*B62J 6/056* (2020.01)
*B62K 21/26* (2006.01)
(Continued)

(52) U.S. Cl.
CPC ................. *B62K 21/26* (2013.01); *B62J 3/14* (2020.02); *B62J 6/056* (2020.02); *B62J 6/165* (2020.02); *B62J 50/22* (2020.02); *B62J 50/25* (2020.02)

(58) Field of Classification Search
CPC ... B62K 21/26; B62J 3/14; B62J 6/056; B62J 6/165; B62J 50/22; B62J 50/25; B62J 6/057; B62J 6/16; B62J 6/24
See application file for complete search history.

(56) References Cited

U.S. PATENT DOCUMENTS

| | | | | |
|---|---|---|---|---|
| 4,623,954 A | * | 11/1986 | Schott ...................... | B62J 6/055 74/551.8 |
| 4,779,169 A | * | 10/1988 | Cruze .................... | B62K 21/26 340/432 |

(Continued)

FOREIGN PATENT DOCUMENTS

| | | |
|---|---|---|
| AU | 2009202824 A1 | 1/2011 |
| CN | 201808618 | 4/2011 |

(Continued)

OTHER PUBLICATIONS

He et al., A MEMS Self-Powered Sensor and RF Transmission Platform for WSN Nodes, IEEE Sensors Journal, vol. 11, No. 123, (Dec. 2011), pp. 3437-3445US.

(Continued)

*Primary Examiner* — Nay Tun
(74) *Attorney, Agent, or Firm* — TraskBritt

(57) ABSTRACT

A safety handle designed to be fitted onto a tubular element of an item of mobile equipment, comprises at least one signaling means. The handle further comprises a radio frequency communication module and an electronic circuit for controlling the communication module by a signal of a change in direction.

10 Claims, 3 Drawing Sheets

(51) Int. Cl.
*B62J 50/25* (2020.01)
*B62J 3/14* (2020.01)
*B62J 50/22* (2020.01)
*B62J 6/165* (2020.01)

(56) References Cited

U.S. PATENT DOCUMENTS

| | | | | |
|---|---|---|---|---|
| 4,875,142 | A * | 10/1989 | Spector | B62J 6/056 |
| | | | | 74/551.8 |
| 5,247,431 | A * | 9/1993 | Liu | B62J 6/056 |
| | | | | 74/551.8 |
| 5,580,152 | A * | 12/1996 | Carter | B62J 6/03 |
| | | | | 74/551.8 |
| 6,081,190 | A * | 6/2000 | Kellermann | B62J 6/055 |
| | | | | 340/432 |
| 6,236,306 | B1 * | 5/2001 | Liebelt | B62K 21/26 |
| | | | | 340/407.1 |
| 6,308,590 | B1 * | 10/2001 | Berto | B62K 21/12 |
| | | | | 74/551.8 |
| 7,891,849 | B2 * | 2/2011 | Campbell | B62K 21/26 |
| | | | | 362/474 |
| 2004/0114383 | A1 * | 6/2004 | Beard | B62K 21/26 |
| | | | | 362/475 |
| 2004/0207520 | A1 | 10/2004 | Chuang | |
| 2011/0051442 | A1 * | 3/2011 | Chang | B62K 21/125 |
| | | | | 362/474 |
| 2017/0369125 | A1 * | 12/2017 | Katsura | B62M 6/55 |
| 2018/0134335 | A1 * | 5/2018 | Rudys | B62J 6/01 |
| 2019/0185104 | A1 * | 6/2019 | Liu | G06F 3/00 |

FOREIGN PATENT DOCUMENTS

| | | | |
|---|---|---|---|
| IT | 201100026 A1 | 3/2013 | |
| JP | 1978-149580 A | 12/1978 | |
| KR | 10-1406281 B1 | 6/2014 | |
| KR | 2017004801 A * | 1/2017 | B62J 6/001 |
| KR | 10-1734353 | 5/2017 | |
| TW | 353142 B | 2/1999 | |
| WO | 2010/123194 A1 | 10/2010 | |
| WO | 2017/149373 | 9/2017 | |

OTHER PUBLICATIONS

International Search Report for International Application No. PCT/EP2020/054940 dated May 28, 2020, 2 pages.
International Written Opinion for International Application No. PCT/EP2020/054940 dated May 28, 2020, 6 pages.
Jiang et al., A Non-Harmonic Motion-Powered Piezoelectric FM Wireless Sensing System, Transducers, (Jun. 21-25, 2015), pp. 710-713.
Miao et al., MEMS Intertial Power Generators for Biomedical Applications, Microsystem Technologies, vol. 12, (2006), pp. 1079-1083.
Mitcheson et al., Architectures for vibration-driven micropower generators, IEEE/ASME J. Microelectromechanical Systems, vol. 13, No. 3, (2004), pp. 429-440.
Pillatsch et al., Real World Testing of a Piezoelectric Rotational Energy Harvester for Human Motion, Journal of Physics: Conference Series, Series 476, (2013), 6 pages.

* cited by examiner

HANDLE WITH A RETRACTABLE DEVICE FOR INDICATING A CHANGE IN DIRECTION

CROSS-REFERENCE TO RELATED APPLICATIONS

This application is a national phase entry under 35 U.S.C. § 371 of International Patent Application PCT/EP2020/054940, filed Feb. 25, 2020, designating the United States of America and published as International Patent Publication WO 2020/173959 A1 on Sep. 3, 2020, which claims the benefit under Article 8 of the Patent Cooperation Treaty to French Patent Application Serial No. 1901959, filed Feb. 26, 2019.

TECHNICAL FIELD

The present disclosure relates to the field of safety equipment for cycles fitted with a handlebar or mobility device, and more particularly the arrangements of optical and sound signaling devices for cycles or mobility equipment such as hiking poles or walking sticks.

It relates, in particular, to a device for signaling a change of direction for bicycles, roller boards, scooters and more generally any mobility device, in particular, any urban mobility device, with the aim of indicating to other users the intention to modify the route or turn to the right or left and/or the position. It is usually accepted that any cyclist who is changing direction signals his intention by extending his arm laterally, thus reducing his balance by 50%, since he only holds his handlebar with one hand. In addition, this action is not always well received by other users, particularly at night, due to the obvious lack of light.

The device allows the cyclist to signal his intention to change direction by acting on a control installed on the handlebar, while reinforcing safety as well as steering control by keeping both hands on the handlebar.

BACKGROUND

Numerous solutions are known in the state of the art in the form of active handles.

Korean patent application KR101406281 describes a direction indicator lamp for a bicycle that is attachable or removably attached to an end portion of a handlebar, performing a direction indicator lamp function, a front light function or a braking function, or an LED installed on the handlebar.

Chinese utility model application CN201808618 describes a guidance system and a bicycle that consists of a control module consisting of a detection unit and a radio frequency transmitter; the detection unit is used to detect the movement of the bicycle and to generate a command as a function of the movement, and the radio frequency transmitter can transmit a radio frequency signal according to the command. A second module consists of a radio frequency receiver and a signaling unit; the radio frequency receiver can receive the radio frequency signal, and the signaling unit can generate a dynamic prompt signal as a function of the radio frequency signal to mark the movement of the bicycle. The signaling system performs the signal connection in radio frequency transmission instead of complex line connection, as a result of which the guidance system can be arranged on the bicycle by a user himself; at the same time, the signaling system can generate various dynamic signaling signals with different functions by radio frequency transmission control.

International patent application WO2017149373 relates to a bicycle helmet with an automatic braking and direction change display, which comprises a helmet body on which a left-turn indicator and a right-turn indicator are mounted laterally in front and behind. The bicycle helmet additionally comprises a control module that is electrically connected to the turn indicators, and a wireless receiver module that is connected to the control module. The helmet further comprises a wireless remote control module that communicates with the wireless receiving module by radio waves. A brake test unit and a manual control unit are electrically connected to the wireless remote control module. The brake test unit, when a wheel brake is activated, and the manual control unit, when a turn indicator switch is actuated, generate a corresponding signal that is transmitted through the wireless remote control module to the helmet in order to control the indicators. Therefore, the cyclist can give corresponding information to the vehicles following him. In this way, the safety of the cyclist is increased.

U.S. patent application US2004207520 describes a turn indicator to be installed on a bicycle with a handle, the indicator comprising:

a transmitting device attached to the handle for transmitting a wireless signal;

a receiving device attached to the bicycle for receiving the wireless signal; and a light electrically connected with the receiving device for signaling an intention to turn the bicycle.

Patent application TWM353142 relates to a bicycle accessory, and more particularly, a direction light with wireless remote control for a bicycle to be screwed on both sides of the handle.

Patent application AU2009202824 describes a set of mirrors for a transport vehicle with a single front wheel, comprising two clamping parts, a mirror provided with a turn indicator lamp, and one end of the mirror is connected to the clamping part; a flexible hose, and a controller, the controller controlling the flashing of the turn indicator.

Patent application ITRA20110026A1 describes another solution of light and sound signaling of a change of direction, braking and danger and of front and rear lights for bicycles and the like.

Patent application WO2010123194 describes a direction indication device for a bicycle that can be attached to the saddle or to a backpack. This device comprises a functional module and a control module. The functional module consists of a box that has a window and a power supply, a first printed circuit board comprising a lamp device, a photovoltaic cell and a speed sensor, a rechargeable battery and a back cover.

Application JPS53149580 describes another known solution.

A first drawback is that when the handle comprises a light source to indicate an intended change of direction, it is necessary for this source to protrude sufficiently from the handlebar to be visible to a driver traveling behind the vehicle and to prevent it from being hidden by the cyclist. However, this leads to a bulk that is detrimental when stopped and can give rise to attempted damage by pulling out.

A second drawback of the solutions of the prior art stems from the appearance on open traffic lanes of autonomous driving vehicles, in which the observation of the driver is no longer systematic. The detection of bicycles, scooters and other urban mobility devices is ensured by various autonomous vehicle sensors (LIDAR, camera), but their interpretation by driving automatons is difficult because of potentially sudden changes in trajectories (to avoid a pothole, due to carelessness, etc.), which are difficult to predict.

BRIEF SUMMARY

In order to address these drawbacks, the present disclosure relates in its most general sense to a safety handle suitable for being fitted to the handlebar of an item of mobile equipment or integrated into the handlebar.

It comprises a part that is stowable between a position where one end equipped with a light signaling source protrudes from the front surface of the handlebar and a position in which the end is engaged in the handlebar as well as a radio frequency communication module and an electronic circuit to control the communication module via a change of direction signal.

The term "stowed position" is understood to mean the position where the largest part of the movable part is engaged inside the hollow cavity of the handlebar, as opposed to the position where the largest part of the movable part protrudes from the open end of the hollow cavity formed in the handlebar.

BRIEF DESCRIPTION OF THE DRAWINGS

The present disclosure will be better understood on reading the following description, which concerns non-limiting embodiments illustrated by the accompanying drawings, in which.

DETAILED DESCRIPTION

Figure 1:
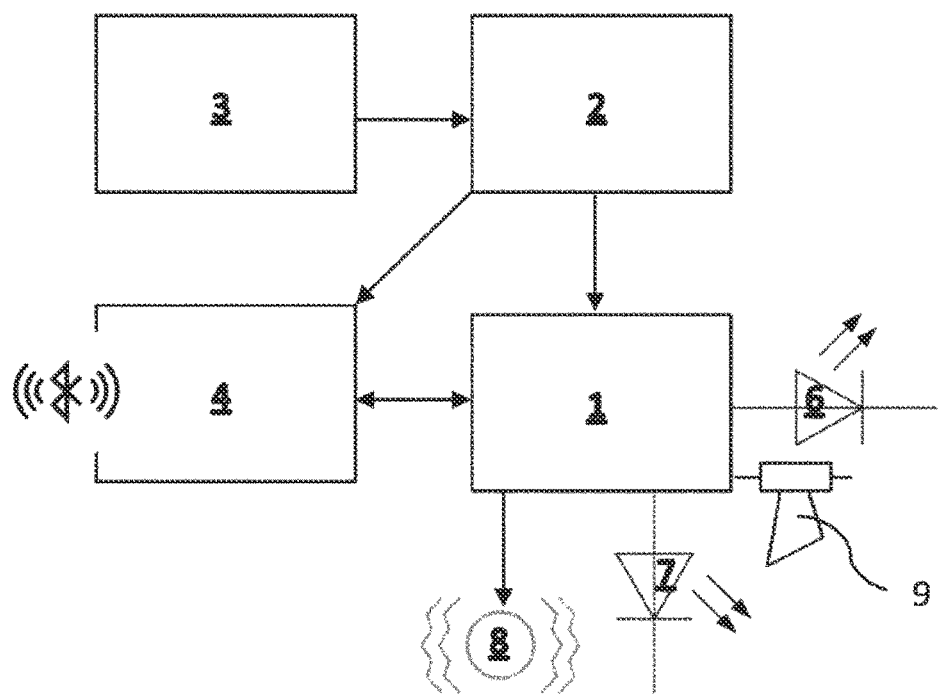
FIG. 1 shows an example of the block diagram of the electronic circuits of a handle according to the present disclosure.
Figure 1:
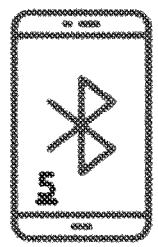

FIG. 1 is a block diagram of a handle according to a non-limiting embodiment of the present disclosure.

An electronic circuit (1) is housed in the handle. It is powered in the described example by a supercapacitor (2) connected to an electric generator by energy recovery (3), for example:

an electromagnetic generator with a suspended system as described in the article "Mitcheson P. D., Green T. C., Yeatman E. M., Holmes A. S., "Architectures for vibration-driven micropower generators," IEEE/ASME J. Microelectromechanical Systems 13(3), (2004), 429-440," or a generator equipped with a movable weight as described, for example, in the article "He C., Kiziroglou M. E., Yates D. C., Yeatman E. M., "A MEMS self-powered sensor and RF transmission platform for WSN nodes," IEEE Sensors Journal, 11(12), (2011), 3437-3445," or an electrostatic generator as described in the example "Miao P., Mitcheson P. D., Holmes A. S., Yeatman E. M., Green T. C., Stark B. H., "MEMS inertial power generators for biomedical applications," Microsystem Technologies, 12, (2006), 1079-1083," or a piezoelectric generator described, for example, in the article "P. Pillatsch, E. M. Yeatman and A. S. Holmes, "Real World Testing Of A Piezoelectric Rotational Energy Harvester for Human Motion," PowerMEMS 2013, London, Dec. 3-6, 2013." or "H. Jiang, M. Kiziroglou, D. C. Yates and E. M. Yeatman, "A Non-harmonic Motion-powered Piezoelectric FM Wireless Sensing System," Transducers 2015, Anchorage, June 21-25."

These devices integrated into the handle recover the vibrational energy to which the handlebar is subjected and make it possible to ensure continuous service, without requiring maintenance, battery replacement or battery recharging. Of course, a conventional power supply by battery or cell can also be considered, possibly associated with a photovoltaic cell.

A communication module (4) is controlled by the electronic circuit (1). In the described example, this communication module is paired with a smartphone (5).

It controls the operation of one or more LEDs (6) intended to be seen by third parties, one or more LEDs (7) intended to be seen by the user of the machine, and a vibrating unit (8) transmitting haptic information via the coating of the handle.

The smartphone can be used to run a guidance program such as GOOGLE MAPS™ or WAZE® and to transmit via the communication module (4), using the BLUETOOTH® Low Energy (BLE) protocol, the information that is processed by the electronic circuit (1), for example, in order to control the activation of the vibrating unit (8), of the LEDs (7) to signal an imminent change of direction to the driver and to the LEDs (6) to control the activation of the indicator lights warning other vehicles of an upcoming change of direction. This information can also be transmitted to a network of vehicle driving assistance systems to supplement data from vehicle sensors and to participate in merging data for the vehicle's cruise control or emergency braking functions.

The smartphone paired with the handle allows the use of components and features that are natively present in most current phones, and therefore avoids replicating these components and features in the handle.

The geolocation of the handle can be ensured by the geolocation means of the smartphone paired with the handle via short-range BLE communication, as well as by transmitting information on the position of the handle to a server. Likewise, the navigation application can be run on the smartphone and the direction change information transmitted to the handle via the short-range communication.

The handle optionally comprises a sound generator (9) controlled by the electronic circuit (1) as a function of speed changes and possibly of proximity detections of a communicating vehicle.

The electronic circuit (1) can control the optical and sound signaling means and the emission of radio frequency signals so as to create a safety bubble around the mobile machine, by the selection of the appropriate warning means according to the vehicle environment, location, weather conditions and movement speed known from the information transmitted by the smartphone to improve the detection capabilities by other road users.

Mechanical Construction of the Handle

FIGS. 2 to 5 illustrate one embodiment of a handle that can be alternately retracted or deployed by brief pressure on the front end of the handle.

For this purpose, the handle contains a bistable mechanism implementing a tilting cam (10) articulated at its rear end (11) by a transverse pivot, and the front end of which has a "T"-shaped head (12) guided in a path having a front "V" (14) and a rear "V" (13), each of the "V"-shaped segments having a middle notch.

Figure 2:
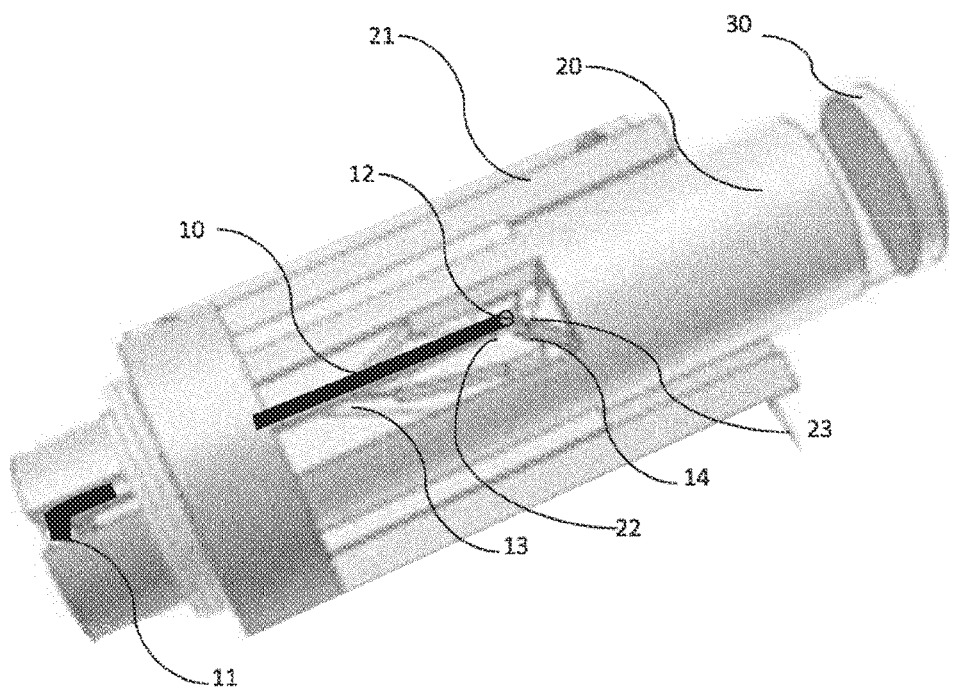
FIG. 2 shows an embodiment of a bistable retractable handle in the retracted position.

FIG. 2 shows the situation where the sleeve (20) of the handle is retracted, that is to say, stored inside the shaft (21) engaged in the handlebar.

The front end (12) of the cam is retained by the bottom (22) of the tip of the front "V" (14) and therefore maintains the sleeve (20) in the retracted position.

Figure 3:
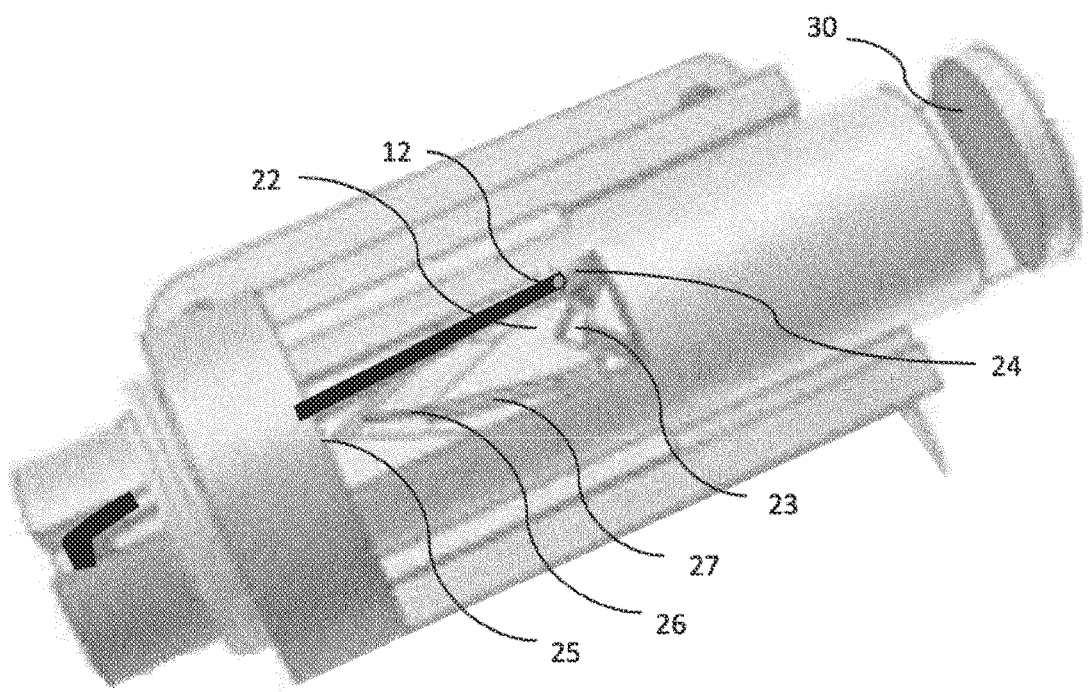
FIG. 3 shows an embodiment of a bistable retractable handle tilting toward the stowed position.

As shown in FIG. 3, when a new pressure is exerted on the front end of the sleeve (20), the tip (23), which is slightly offset from the bottom (22) of the tip of the front "V" (14), pushes back the "T"-shaped head (12) into a guide path section corresponding to one of the branches of the "V," connecting the top (24) to the tip (25) of the rear "V" (13).

Figure 4:
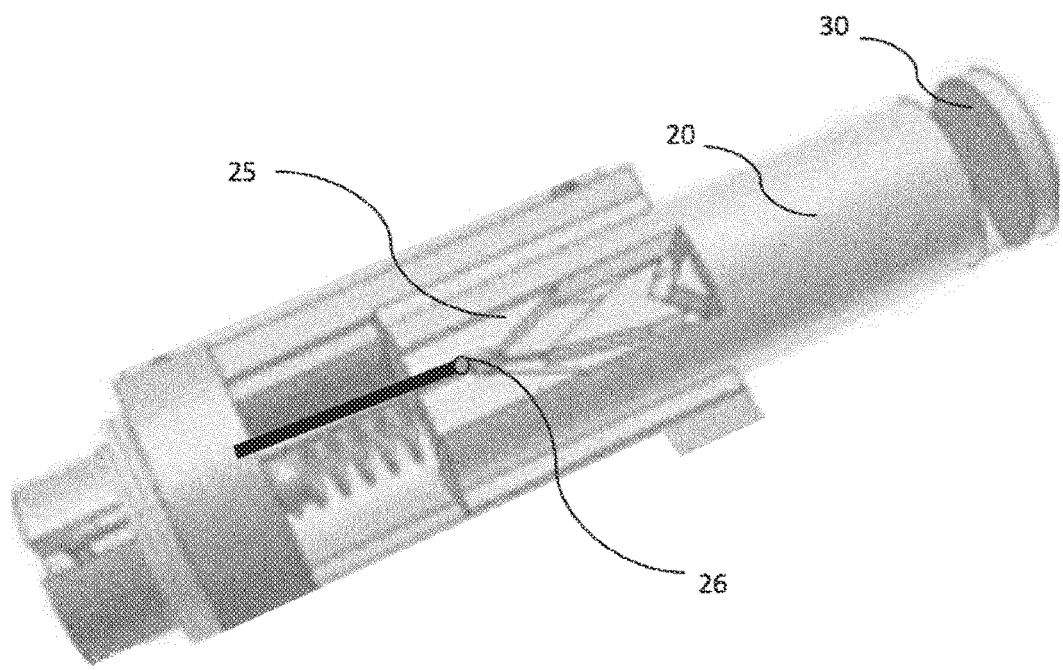
FIG. 4 shows an embodiment of a bistable retractable handle in the stowed position.

By releasing the pressure on the front end of the sleeve (20), a spring (not shown) pushes the sleeve (20) and the "T"-shaped head (12) slides into the branch (25) until it comes into abutment against the tip (25) of the rear "V" (13). The sleeve (20) is then completely stowed, as shown in FIG. 4.

Figure 5:
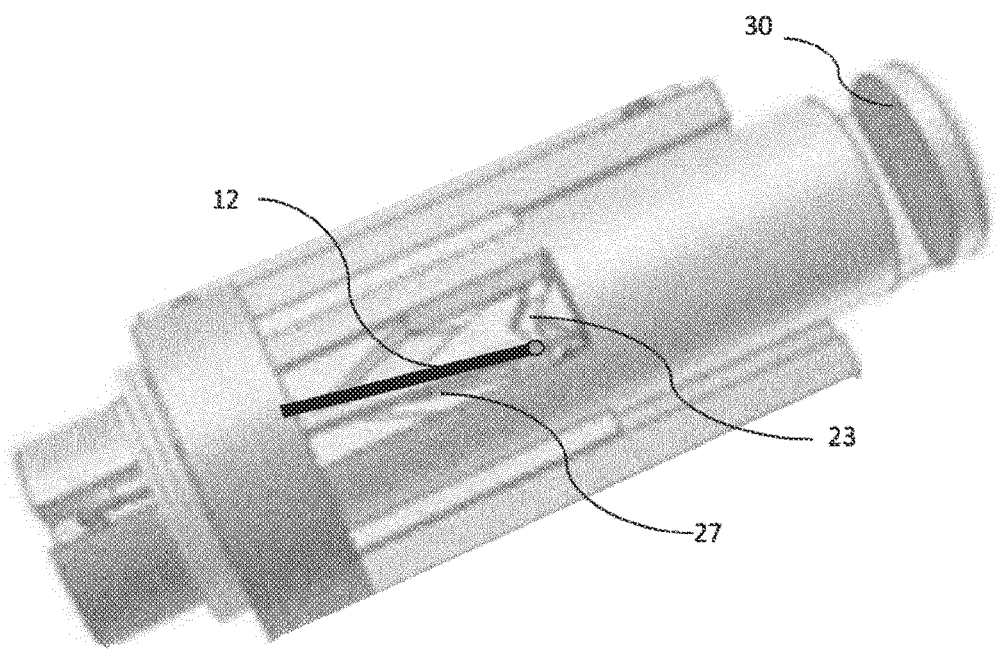
FIG. 5 shows an embodiment of a bistable retractable handle tilting toward the retracted position.

When a new pressure is exerted on the front end of the sleeve (20), the tip (26), which is slightly laterally offset from the bottom of the tip (25) of the rear "V," leads the "T"-shaped head (12) into the second branch (27), which allows the sleeve (20) to be pushed back into its shaft to the retracted position illustrated in FIG. 5. By releasing the pressure, the "T"-shaped head (12) returns to the bottom of the front "V," as shown in FIG. 2.

This mechanism intuitively and robustly allows switching between a position where the sleeve (20) is protected by the shaft (21) engaged in the handlebar, and a stowed position where it protrudes from the handlebar.

The sleeve (20) contains the electronic circuit and the antenna of the radio frequency module is housed in a front part (30) made from partially transparent plastic material to allow illumination by the LEDs.

Alternatively, the sleeve (20) can be motorized, an actuator ensuring the movement relative to the shaft (21), for example, when starting a motorized device or an unlocking key of the NFC-infrared RFID type for remote control.

Optionally, the handle is fitted with a switch allowing the user to manually control the switching on of the LEDs to signal his change of direction to a third party.

The user's smartphone or navigation equipment is connected to the indicators and/or the handles in order to control the activation of the lighted means for signaling a change of direction and, if necessary, for emitting a radio frequency signal:

To a third party by a light signal on the left or on the right (flashing). This signal can be disengaged at the switch.

To the user by a visual or sensory display: light signal inside each handle (via LED) and/or vibration (on the handle) that intensifies or accelerates upon approaching the change of direction and that vibrates several times depending on the direction to be followed at an intersection.

The indication of the concerned change of direction communicates the distance to be covered and the direction to be taken.

The light or haptic signals can be coded, for example, according to the distance to be traveled before changing direction (Left or Right). The distances can change and can be set based on the vehicle used. For example:

a single LED lights up or flashes when the navigation application signals a change in 100 m;

three LEDs light up or flash when the navigation application signals a change in 50 m;

five LEDs light up or flash when the navigation application signals an imminent change.

For a vibrating unit:

a short, gentle vibration when the navigation application signals a change in 100 m;

a medium, gentle vibration when the navigation application signals a change in 50 m;

a strong, long vibration when the navigation application signals an imminent change.

For a sound system:

a short, soft sound when the navigation application signals a change in 100 m;

a moderately long, soft sound when the navigation application signals a change in 50 m;

a long, loud sound when the navigation application signals an imminent change.

Example of information for the change of direction at an intersection: the number of flashes of the LED or of short vibrations of the vibrating unit indicates the number of the street to be taken.

According to another option, the handle contains an accelerometer, the signals of which are processed by the electronic circuit (1) to control the activation of the signaling means and to detect falls in order to control the emission of an alert signal.

In the event of a fall or collision (measurement of a sudden stop by an accelerometer, located in the handles or elsewhere on the vehicle or on the user (watch, jacket, helmet, etc.)), and if the user has not grasped the handles after X seconds, then the signals flash, and after another Y seconds a query message is displayed on the smartphone and the display; if no action is taken-response from the concerned user-then the smartphone sends a message or call to an emergency service.

According to another option, the transmitting system forms a connected and communicating active safety hemisphere.

Depending on the location and the situation (countryside, urban environment, inclement weather such as rain, snow, ice; where the travel speed of cars and other vehicles such as trucks, buses, tractors, etc., is different), depending on the speed and movement of the user (algorithm to determine the path he will follow and to identify whether he is on a bike, on foot running, on a scooter, etc.), his physiological data (age, height, weight), the footprint of the hemisphere and the signal technology used will be different. The same will be true if the system is on the vehicle; its characteristics, size weight and speed will be transmitted.

The size of the hemisphere and the signals sent will adapt to the situation; it can therefore be ovoid in length (to avoid an unintentional overlap in town) or round, etc. It covers the user and the vehicle in terms of height, which allows them to communicate with drones.

For example, in town, it takes 3 m for a car to stop when it is traveling at 30 km. The same is not true on a country road or in the event of rain, snow or ice. The size of the hemisphere will adapt. Likewise, due to the speed of another vehicle (car, motorcycle, truck, tractor), the signal used cannot be the same: in town, BLE and ENOCEAN®; in the countryside, LTE™ and NB-IOT™. The hemisphere behaves like a chameleon and communicates information on its movement with other users and other vehicles. It also receives information.

More generally, the handle, according to the present disclosure, is configured to allow the exchange of information with a transport space management infrastructure, in particular, with fixed or mobile elements and/or equipment, devices, terminals, chips, facilities of machinery or equipment, ensuring the sharing and relaying of information between vehicles, and users on the one hand and the bicycle/scooter (etc.) equipped with communicating handles on the other hand.

Locking

Optionally, the handle comprises a locking means, for example, electromagnetic, maintaining the stowable part in the stowed position, to avoid unintentional manipulations. In the locked position, the handlebar can also be locked by an electromagnetic lock, or set in free rotation by a means for releasing the connection between the handlebar and the axle controlling the orientation of the wheels.

The invention claimed is:

1. A safety handle configured to be fitted to a handlebar of an item of mobile equipment, comprising at least one signaling device comprising:
   a radio frequency communication module;
   an electronic circuit for controlling the communication module; and
   a part that is stowable between a first position where one end of the part is equipped with a light signaling source that protrudes from a surface of the handlebar and a stowed second position, the light signaling source being controlled by the radio frequency communication module and the electronic circuit responsive to a signal of a change of direction.

2. The safety handle of claim 1, wherein the communication module is configured to exchange data with a smartphone.

3. The safety handle according to claim 1, wherein the communication module is configured to exchange data with a road network management infrastructure.

4. The safety handle of claim 1, further comprising an energy collection device configured to supply power for the electronic circuit and the communication module.

5. The safety handle of claim 4, wherein the energy collection device comprises a piezoelectric generator or an electromagnetic generator.

6. The safety handle of claim 5, further comprising an actuator for controlling the movement of the stowable part.

7. The safety handle of claim 1, wherein the light signaling source protrudes from a front surface of the handlebar in the first position.

8. The safety handle of claim 1, further comprising a haptic surface area controlled by the electronic circuit as a function of change of direction information coming from a navigation application run by the electronic circuit or by a smartphone communicating with the radio frequency communication module.

9. The safety handle of claim 1, further comprising a gyroscopic sensor delivering a signal controlling the activation of the signaling device via the electronic circuit.

10. Handlebar A handlebar comprising a safety handle according to claim 1, comprising a locking mechanism for locking the stowable part of the safety handle in the stowed position.

* * * * *